INVENTORS.
ALEXANDER HING MARK &
JOSEPH NECAS
BY
ATTORNEYS.

INVENTORS.
ALEXANDER HING MARK &
BY  JOSEPH NECAS

ATTORNEYS.

3,306,302
THRESHING ASSEMBLY
Alexander Hing Mark, Livonia, Mich., and Joseph Necas, Toronto, Ontario, Canada, assignors to Massey-Ferguson Limited, Toronto, Ontario, Canada, a corporation of Canada
Filed May 5, 1964, Ser. No. 365,062
5 Claims. (Cl. 130—27.8)

This invention relates to agricultural threshing machines and more particularly concerns a cylinder-concave assembly for such machines.

It is an object of the present invention to provide an improved conical-type threshing assemby which clears itself of large foreign objects and slugs of the harvested mass so as to avoid interruptions in operation and permit efficient, fully loaded functioning.

Another object is to provide an assembly of the above kind which allows accurate, easily made adjustment of the spacing or clearance between the cylinder and the concave of the assembly so that the proper setting for the nature, condition and density of the crop can be readily attained.

A further object is to provide an assembly as characterized above with a compact control mechanism which is sturdy and smoothly operable so as to be well suited for commercial manufacture and practical use.

Other objects and advantages of the invention will become apparent upon reading the following detailed description and upon reference to the drawings, in which:

FIG. 4 is a section taken approximately along the line 4—4 in FIG. 3;

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
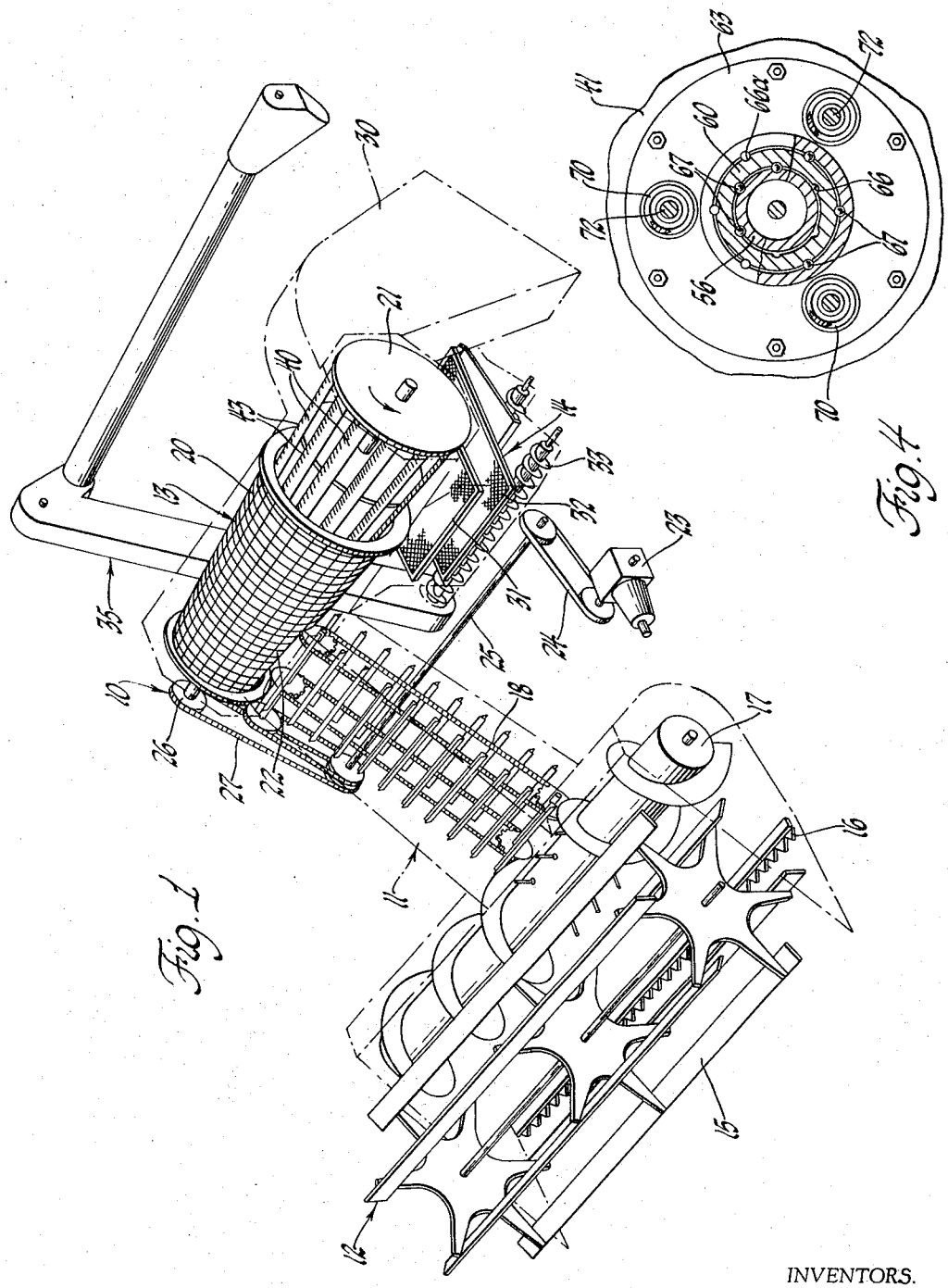
FIGURE 1 is a fragmentary perspective of a combine embodying the invention and having portions broken away for clarity.

Turning first to FIG. 1, there is shown a portion of a combine 10 embodying the invention and including a frame 11, diagrammatically illustrated, which supports a header assembly 12, a threshing and separating assembly 13 and a cleaning assembly 14. The header assembly 12 includes a reel 15 which revolves above a cutter bar 16 so that the crop is gathered, harvested and fed rearwardly to a table auger 17 that feeds the harvested mass to a floating elevator 18.

The threshing and separating assembly 13 includes a generally conical grate concave 20 and a generally conical cylinder 21 journalled coaxially within the concave. The harvested mass is fed to the assembly 13 through an opening 22 in the lower front portion of the concave 20. The cylinder 21 is driven in a counterclockwise direction as seen in FIG. 1 with power being supplied from a transmission 23 connected by a belt 24 to a transverse shaft 25 which is coupled to a cylinder pulley 26 by a belt 27. The harvested mass is driven around and axially between the concave 20 and the cylinder 21 so that the mass moves in a generally helical path counterclockwise and to the left as viewed in FIG. 1. The straw is discharged rearwardly and downwardly through a chute 30 and the separated grain passes through the concave 20 and is directed to the cleaning assembly 14.

The cleaning assembly 14 includes shaker shoe sieves or screens 31 and 32 which cooperate with a fanning mill, not shown, to clean the grain by blowing chaff and foreign material out with the straw through the chute 30. The grain passes downwardly and is transferred by an auger 33 to an elevator and cross auger assembly 35 that is effective to deliver the grain to the desired storage point.

Figure 2:
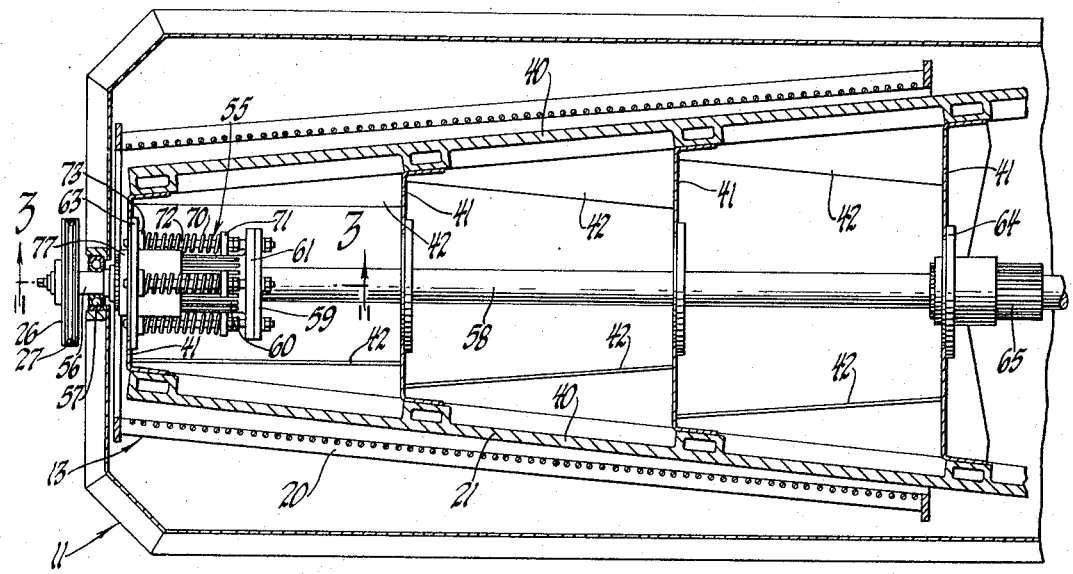
FIG. 2 is an enlarged longitudinal section through the concave and grate assembly of the combine shown in FIG. 1.
Figure 6:
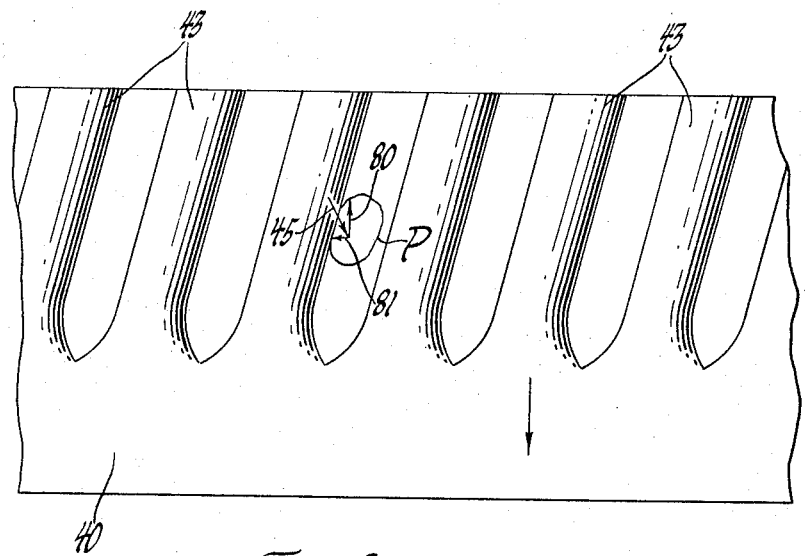
FIG. 6 is a fragmentary elevation of the portion of the cylinder shown in FIG. 5.

The threshing cylinder 21 is formed of a plurality of peripheral, axially extending rasp bars 40 mounted on support disks 41 (see FIG. 2). Stiffener plates 42 are provided to strengthen the cage-like structure of the threshing cylinder 21. Preferably, the rasp bars are formed with grooves 43 on their outer surfaces which are angled so as to impart a helical path producing driving force on the harvested mass. That is, particles P of the harvested mass (see FIG. 6) are struck by the edge of the grooves 43 as the rasp bar rotates in the direction of the arrow 44 so as to exert a glancing blow in the approximate direction of the arrow 45. This tends to impel the particle P in the desired generally helical path.

Preferably, the cylinder 21 is formed with a slightly greater conical angle than the concave 20 so that the space between these elements, within which the threshing takes place, converges, as best seen in FIG. 2. The convergence of the conical threshing region tends to maintain a more uniform cross sectional area through which the crop material flows since the increasing diameter of the crop flow path is offset by the convergence or narrowing down of the threshing region. Moreover, it is desirable to provide slightly more convergence than is required to compensate for the increasing diameter of the threshing region so that the cross sectional area through which the harvested mass moves decreases as the material spirals helically between the cylinder and the concave. A decreasing cross sectional area is desirable since the velocity of the crop material increases as the diameter of its flow path increases, and the reduced cross sectional area in the threshing region tends to maintain a more uniform density of crop material throughout the length of the cylinder . Also, there is a slight reduction in the mass of the crop material as grain is separated out, and the decreasing cross sectional area compensates for this and maintains a more uniform density of the crop material being treated. The uniform density insures more uniform threshing and separating.

In accordance with the invention, the cylinder 21 is mounted for axial shifting movement and provision is made for yieldably counter-balancing the axially directed forces acting on the cylinder when it is in normal operation so as to hold the cylinder in a neutral axial position. However, the yieldable force can be overcome and, hence, the cylinder is able to shift axially toward the right in FIG. 2 to increase the clearance between the cylinder and the surrounding concave 20 when there is an increase in axial force on the cylinder exerted in that direction. As will be pointed out below, this makes the cylinder self-clearing since slugging of the crop material or jamming of a foreign object between the cylinder and the concave develops an axial force on the cylinder which shifts it to the right, as seen in the drawings, so as to clear the force producing obstruction.

In the illustrated construction, a compact control mechanism 55 is provided to rotatably drive, yieldably hold, and axially adjust the cylinder 21. The mechanism 55 includes a stub shaft 56 which is journalled in a bearing 57 mounted in the frame 11. The outer end of the stub shaft 56 carries the pulley 26 and hence the stub shaft is rotatably driven.

A cylinder shaft 58 is mounted coaxially with the stub shaft 56 for both rotation and axial movement. Preferably, the shaft 58 is tubular and rigidly carries an end cap 59. A sleeve 60 is piloted over the end of the stub shaft 56 and formed with a flange 61 that is securely bolted to the end cap 59.

The cylinder 21 is mounted for axial movement on the shaft 58 through collars 63 and 64 which mount two of the support disks 41 that carry the rasp bars 40 of the cylinder. The collar 63 is slidably fitted on the sleeve 60 and the collar 64 is slidably splined on a spline portion 65 of the cylinder shaft 58. The opposite sides of the cylindrical portion of the sleeve 60 are formed with axially extending splines 66 and 67, and there are opposed axially extending splines on both the collar 63 and the stub shaft 56. Keyed in the opposed splines are sets of balls 67 so that the balls transmit torque between the stub shaft 56 and the surrounding sleeve 60, and between the sleeve 60 and the surrounding collar 63. Also, the balls permit free relative axial movement between the parts. The balls 67 are loosely retained in spaced position by rod-like spacers 68, and snap rings 69 hold the parts in assembled relation.

To yieldably establish a neutral axial position for the cylinder 21, a plurality of helical springs 70 are compressed between the collar 63 and adjustable seats 71 threadably secured on rods 72 which are fixed with respect to the cylinder shaft 58. In the illustrated construction, the springs 70 fit over the rods 72 and the rods pass freely through the collar 63 loosely carrying seats 73 which anchor the ends of the springs 70 that act on the collar. The threaded seats 71 are held in adjusted position by jam nuts 74 and the rods 72 are anchored by being passed through the sleeve flange 61 and the end cap 59, with these latter parts being tightly sandwiched between the threaded portion of the rod and securing nuts 75.

Figure 3:
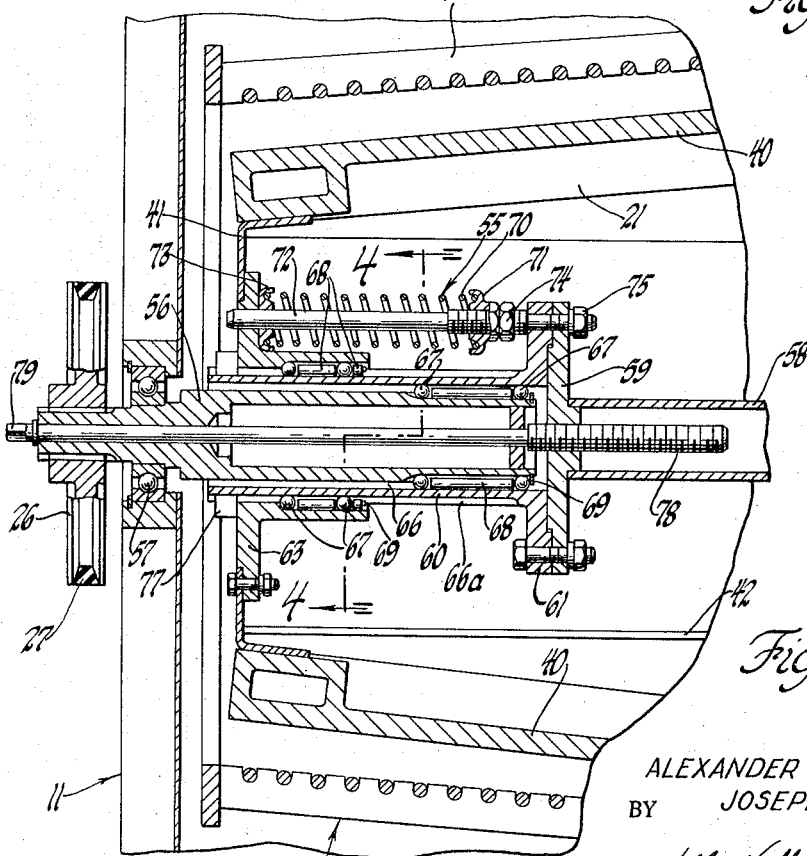
FIG. 3 is an enlarged section taken approximately along the line 3—3 in FIG. 2.

It can thus be seen that the cylinder 21 is free to move axially to the right as seen in FIGS. 2 and 3 against the force exerted by the springs 70 with the collar 63 rolling easily over the sleeve 60. The neutral operating position toward which the springs 70 urge the cylinder 21 is established by a stop ring 77 fixed in a peripheral groove formed in the sleeve 60 and against which the collar 63 abuts.

To provide for axial adjustment of the cylinder neutral position, a threaded rod 78 is threadably fitted in the end cap 59 of the cylinder shaft 58 and is rotatably anchored in the stub shaft 56. An end of the rod 78 extends from the end of the stub shaft 56 and is formed with a wrench receiving head 79 so that the rod may be easily turned from outside of the frame 11 so as to threadably shift the cylinder shaft 58, and thus the sleeve 60, axially with respect to the stub shaft 56. This of course varies the axial position of the stop ring 77 and, hence, changes the neutral position of the cylinder 21 without, of course, varying the force exerted by the springs 70. Because of the balls 67, the sleeve 60 rolls freely in an axial direction on the stub shaft 56.

In order to understand the operation of the threshing and separating assembly 13, a brief analysis of the forces acting on the cylinder 21 should be made. There is, first of all, a "no load" force which is apparently an inherent result of the conical configuration of the cylinder 21. The "no load" force acts axially on the cylinder in a direction tending to shift the cylinder toward the right as seen in FIG. 2. The "no load" force increases with cylinder r.p.m. and is also affected by the shape and mass of the cylinder and, hence, must be empirically determined for a particular cylinder design.

A second axial force acting on the cylinder 21 is the "acceleration" force. This is the reaction by the harvested mass to the accelerating force exerted on the particles of the mass in the direction of the arrow 45. The reaction of each harvested mass particle P on the edge of the grooves 43 has a circumferential component 80 and an "acceleration" force component 81 which tends to shift the cylinder 21 to the left as seen in FIG. 2. The magnitude of the acceleration force varies directly with cylinder r.p.m., varies directly with the angle at which the grooves 43 are formed, varies directly with an increasing load of harvested mass acted on by the cylinder, and has a slight inverse relationship to the conical angle of the cylinder.

Figure 5:
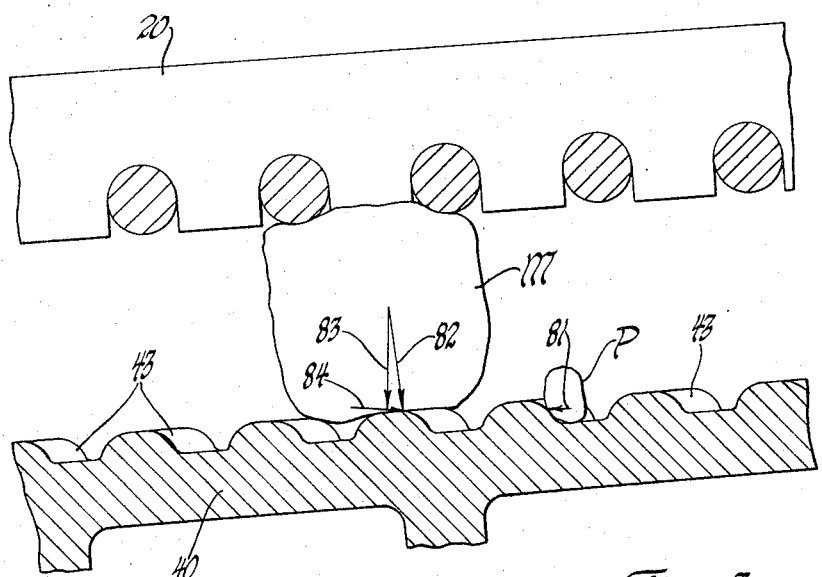
FIG. 5 is an enlarged fragmentary section of portions of the cooperating concave and cylinder otherwise shown in FIG. 2.

The third force to consider is the "squeeze" force caused by pressing material between the converging conical cylinder 21 and the surrounding conical concave 20. Squeezing a mass M between the concave and the cylinder (see FIG. 5) develops a reaction force 82 against the cylinder that has a radially extending component 83 and a "squeeze" force producing component 84. The squeeze force thus tends to shift the cylinder 21 toward the right as seen in the drawings and it will be evident that the magnitude of the squeeze force varies directly with the amount of harvested mass being pressed between the cylinder and concave, varies directly with the conical angle of the cylinder, and varies directly with the amount of convergence or narrowing down of the threshing region between the cylinder and the surrounding concave.

In the construction being illustrated and described herein, the force of the springs 70 is exerted on the cylinder so as to shift it toward the left in opposition to the "no load" force and the "squeeze" force, and in the same direction of the "acceleration" force. This, however, is simply because in a particular workable embodiment the summation of the no load force and the squeeze forces were greater, under normal operating conditions, than the acceleration forces. If different parameters are chosen in the design of the threshing assembly, it is possible that the acceleration force would exceed the no load and squeeze forces so that the springs would have to act in the opposite direction to yieldably hold the cylinder in a neutral position. The factors affecting the magnitude of these forces have been discussed above.

It can now be appreciated that when the threshing and separating assembly 13 becomes overloaded, there is a rapid increase in the "squeeze" force so that the forces tending to shift the cylinder toward the right in the drawings overcomes those acting in the opposite direction, with the result that the cylinder is shifted to the right, thereby increasing the spacing between the cylinder periphery and the concave and this, of course, frees the slugged material from its wedged position in the threshing region. When the slugged material is passed through the assembly 13, the magnitude of the "squeeze" force drops and the springs 70 return the cylinder to its normal operating neutral position.

To give a practical example of the practice of the invention and to further illustrate the development and interaction of the several forces discussed above, a working embodiment of the invention was constructed in which the cylinder was seventy-nine inches long with a small end diameter of fifteen inches and a large end diameter of twenty-six inches. The conical angle was eleven degrees, sixteen minutes. The cylinder of this dimension was mounted in a conical concave having a small end diameter of seventeen and one half inches and a large end diameter of twenty-six and a quarter inches, the conical angle of the concave being ten degrees. The rasp bar grooves 43 were disposed at an angle of thirty degrees from a radial plane. With this construction, it was found that the summation of the "no load," "acceleration" and "squeeze" forces, under normal operating conditions tended to move the cylinder out of the concave or to the right as seen in FIG. 2. Hence, the spring bias created by the springs 70 was exerted toward the left.

An analysis of the forces acting on the cylinder in opposition to the springs was made. With the cylinder driven at 635 r.p.m., a "no load" force of 160 pounds was exerted in opposition to the spring force. Wheat having a straw and chaff/grain ratio of 1.8/1.0 was fed into the threshing assembly, and the force acting in opposition of the springs dropped to approximately sixty pounds as the "acceleration" force developed in opposition to the "no load" force. With this wheat being supplied at a 450 pound per minute feed rate, the force acting against the spring bias rose and varied between 160 and 205 pounds, the increase being due to the development of the "squeeze" force as full loading of the threshing and separating assembly was reached.

It can thus be seen that the total force exerted by the springs 70 can be set at approximately 200 pounds in the example given so as to hold the cylinder in a normal neutral position and permit normal efficient threshing under full load conditions. If slugging occurs, the squeeze force rises so that the spring 70 yield to permit the cylinder to clear itself.

Those skilled in this art will appreciate that the multiple function control mechanism 55 is a particularly compact and sturdy unit capable of smooth reliable operation and hence well adapted for commercial manufacture and use. The axial adjustment permitted by the rod 78 sets the neutral position of the cylinder and the initial clearance between the cylinder and the concave so as to give the operator of the combine control of threshing effectiveness for crops of varying nature, condition and density.

We claim as our invention:

1. A threshing cylinder assembly comprising, in combination, a frame, a rotatably driven stub shaft journalled in said frame, a cylinder shaft mounted in said frame coaxially with said stub shaft for both rotation and axial movement, a threshing cylinder mounted on said cylinder shaft, means interconnecting said stub shaft and said mounting shaft for selectively varying the axial position of said mounting shaft, and means interconnecting said stub shaft and said cylinder for simultaneous rotation.

2. A threshing cylinder assembly comprising, in combination, a frame, a rotatably driven stub shaft journalled in said frame, a cylinder shaft mounted in said frame coaxially with said stub shaft for both rotation and axial movement, a threshing cylinder mounted for axial movement on said cylinder shaft, means for yieldably holding said cylinder in a neutral axial position on said shaft, means interconnecting said stub shaft and said mounting shaft for selectively varying the axial position of said mounting shaft, and means interconnecting said stub shaft and said cylinder for simultaneuos rotation.

3. A threshing cylinder assembly comprising in combination, a frame, a rotatably driven stub shaft journalled in said frame, a cylinder shaft mounted in said frame coaxially with said stub shaft for both rotation and axial movement, a threshing cylinder mounted for axial movement on said cylinder shaft, means including adjustably prestressed springs for yieldably holding said cylinder in a neutral axial position on said cylinder shaft, a threaded rod interconnecting said stub shaft and said cylinder shaft for selectively varying the axial position of said cylinder shaft, and means including opposed axially extending splines with interfitting balls for keying said stub shaft and said cylinder together for simultaneous rotation while permitting free relative axial movement.

4. A threshing assembly comprising, in combination, a conical concave, a conical cylinder journalled coaxially within said concave, means for rotatably driving said cylinder, said cylinder being mounted for axial shifting movement to a selected neutral position, and means for yieldably counterbalancing the axially directed forces acting on said cylinder when in normal operation so as to hold the cylinder in said neutral position, said counterbalancing means yielding so that said cylinder can move axially to increase the clearance between the cylinder and said concave upon increases in axial force in that direction.

5. The combination of claim 4 in which said cylinder has axially extending rasp bars with grooves on their outer surfaces, said grooves being anlged so as to impart a helical path producing driving force on the harvested mass.

References Cited by the Examiner

UNITED STATES PATENTS

| | | | |
|---|---|---|---|
| 1,029,451 | 6/1912 | McKee | 130—6 |
| 1,096,554 | 5/1914 | Morrison | 130—6 |
| 2,325,654 | 8/1943 | Borchers | 130—6 |
| 2,484,228 | 10/1949 | Isay | 130—6 |

ABRAHAM G. STONE, *Primary Examiner.*

ANTONIO F. GUIDA, *Examiner.*